Patented Apr. 14, 1931

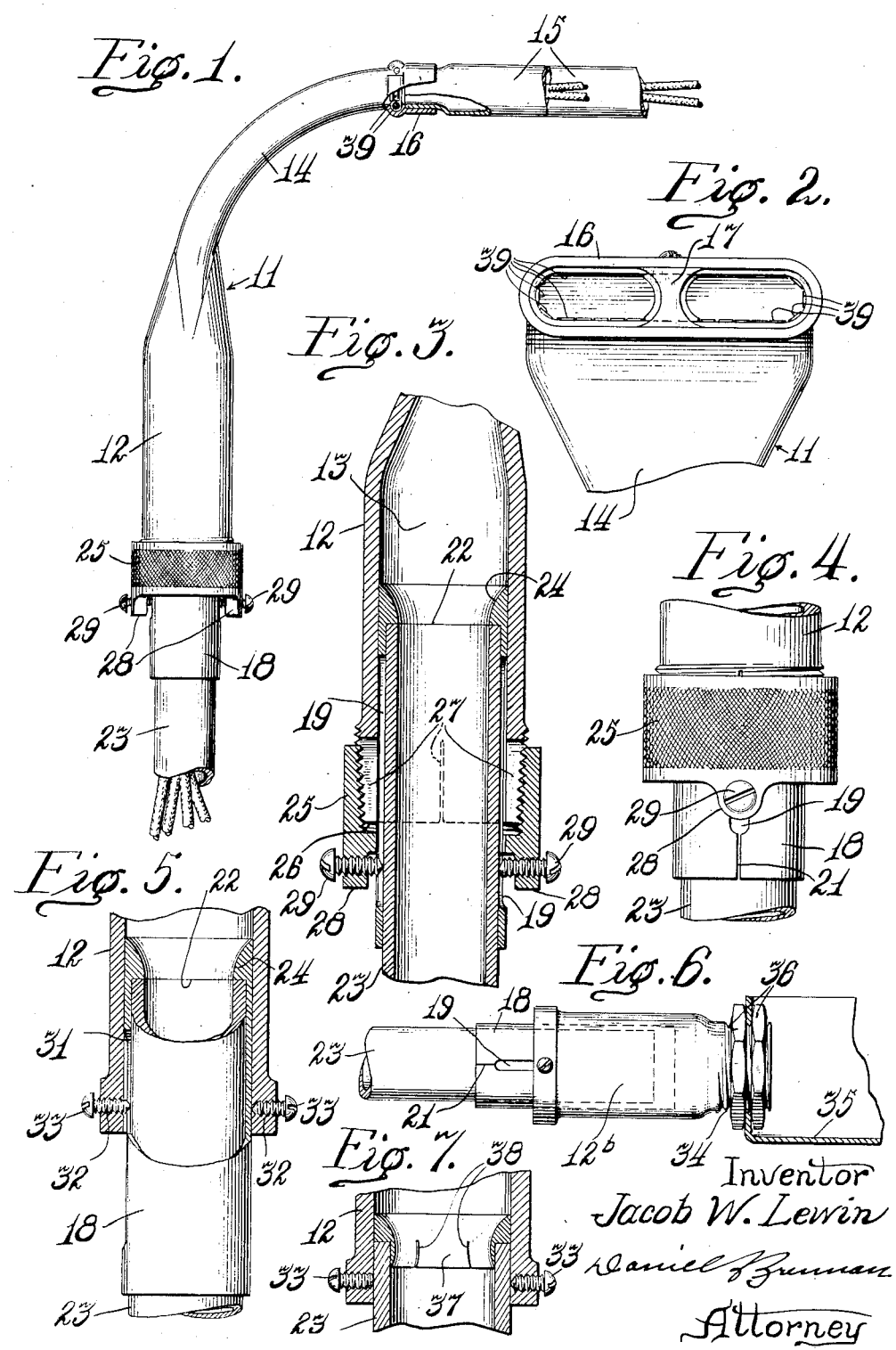

1,800,840

UNITED STATES PATENT OFFICE

JACOB W. LEWIN, OF OAK PARK, ILLINOIS

SLIDE CONNECTION FOR COUPLERS

Application filed February 24, 1930. Serial No. 430,823.

The invention relates to improvements in conduit couplings and particularly to an improved coupling having novel means therein to afford adjustment of a conduit relative to the coupling without obstructing the passage therethrough, and having means for securing said conduit in an adjusted position.

An object of the invention is to provide an improved coupler of the character referred to having means therein for adjustably receiving conduits of various sizes.

Another object of the invention is to provide an improved coupler, capable of adjustably receiving conduits, having means therein for providing a smooth interior surface to facilitate the feeding of wires therethrough.

Another object of the invention is to provide an improved coupler of the character referred to having novel means therein for securely anchoring and grounding a conduit in an adjusted position.

Another object of the invention is to provide an improved adaptor for oval ducts having novel means therein for adjustably securing a conduit in place.

Another object of the invention is to provide an improved coupler of the character referred to which is inexpensive to manufacture and may be readily assembled and mounted in place.

The foregoing and such other objects of the invention as will appear hereinafter as the description proceeds, will be more readily understood from a perusal of the following specification, reference being had to the accompanying drawing, in which:

Fig. 1 is a side elevational view of the improved coupler showing a conduit in place.

Fig. 2 is an enlarged elevational view of one end of the coupler.

Fig. 3 is a longitudinal central sectional view through the other end of the coupler showing a conduit mounted therein.

Fig. 4 is a fragmentary elevational view of the improved structure.

Fig. 5 is a longitudinal central sectional view similar to Fig. 3, showing a modification of the invention.

Fig. 6 is an elevational view of another modified form of the invention.

Fig. 7 is a fragmentary longitudinal central sectional view of a further modification.

The preferred form of the improved coupler illustrated in Figs. 1 to 4, inclusive, preferably comprises a curved conduit coupler or an adaptor for oval ducts having a comparatively smooth interior surface gradually arched to facilitate the feeding of electric wires through the same. The conduit coupling is preferably provided with novel means on one end to facilitate mounting therein of oval ducts and on the other end, with means for slidably mounting and securing therein a conduit.

Referring, in detail, to the preferred form of the invention, the oval duct adaptor or coupling 11 is provided with a substantially cylindrical body portion 12 formed with a central opening or passage 13. One end of the body portion 12 preferably terminates in an extension 14, said extension being curved on a relatively small radius to reduce the general overall size of the coupling. The extension 14 is substantially flattened in cross section to provide an elongated oval passageway in continuation of the central opening 13 in the body portion 12.

The particular type of coupler illustrated is adapted to be used when employing one conduit pipe for housing two independent lines or groups of wires, said lines extending substantially parallel outwardly from one end of the extension 14. Suitable means for receiving the oval-shaped ducts 15 is provided in the free end of the extension 14, said end being preferably struck outwardly to provide an offset portion 16. The end of the oval duct 15 is adapted to extend into said offset end and abut a shoulder formed by said offset to provide a smooth passageway at the connection so that the wires or lines may easily be threaded through. It is preferable that a partition wall 17, provided for spacing the oval ducts 15 apart and for closing the space therebetween, be removably secured in the offset 16. Upon removal of this partition an oval-shaped duct of substantially the same cross sectional area as that of the opening at 16 may be inserted in the end of the extension 14.

The free end of the body portion 12 is adapted to receive a sleeve 18 of substantially greater length than the body portion and preferably being formed with longitudinal slots 19 and slits 21 to permit its frictionally engaging the interior wall of the body 12. The end of the sleeve 18 which extends into the body portion 12 is preferably formed with an inwardly directed annular shoulder or flange 22 which provides an abutment for the end of a conduit 23. The interior surface of the sleeve 18, between the shoulder 22 and the innermost end of said sleeve, is flared outwardly, as at 24, to provide a gradual incline from the inner wall of the body 12 to the inner surface of conduit 23. This gradual incline prevents abrasion of the wires while they are being drawn through the conduit and insures their proper feeding therethrough.

The conduit 23 and sleeve 18 are adapted to be adjusted in unison within the body 12 to any desired position. These parts are securely held in adjusted position by a knurled lock nut or sleeve 25 which engages the pipe threads on the end 26 of the body 12. It is preferable that the body 12 be slit for a short distance inwardly of its end, as at 27. With the parts in position within the body 12, the annular lock nut 25 is drawn tightly over the slit end 26 of the body to cause said body to frictionally engage the sleeve 18. This prevents longitudinal movement of said sleeve; and the sleeve, being slit at 21, frictionally engages and holds conduit 23 in place.

To positively secure the conduit 23 within the body 12 and to provide the required ground therefor, it is desirable to form lugs 28 on the lower end of the lock nut 25. These lugs are each apertured to receive in threading engagement therethrough lock screws 29 which preferably extend through the slot 19 in the sleeve 18 and engage into the conduit 23.

Referring to the form of the device illustrated in Fig. 5, it will be noted that the lock nut 25 is dispensed with and but one slot 31 is provided in sleeve 18. In this instance, the body 12 is provided with threaded apertures 32 adjacent its end for receiving screws 33. One of the screws 33 is adapted to engage the sleeve 18 to prevent its displacement and the other screw passes through slot 31, in the sleeve, and engages conduit 23, thereby providing a positive ground therefor.

The adjustable features of the structures described in the foregoing may readily be adapted for providing a slidable connection for mounting conduits in an outlet box or in the housing of a generator or motor. As shown in Fig. 6, the body portion 12b is preferably threaded at 34 for insertion into the usual opening provided therefor in the outlet box 35. The usual retaining nuts 36 securely lock the body in place.

In Fig. 7 a ferrule is provided, which is formed with a shoulder for seating upon the end of the conduit 23. An annular lip portion 37 extends into the conduit and is formed with suitable slits 38 for frictionally engaging the inside surface of the conduit to hold the ferrule against displacement.

It may be desirable to provide suitable anti-friction means in the coupler to facilitate its adaptation for use when housing lead cable or the like. Cable of this character is quite heavy and to pull any length through a conduit requires considerable energy to overcome the friction between the cable and the conduit. This is especially noticeable at bends in the conduit. As illustrated in Figs. 1 and 2, anti-friction rollers 39 are arranged in the body of the coupler upon which the cable may slide while being drawn through the conduit.

In the various forms of the device illustrated and described, the shoulder on the sleeve or on the ferrule remains always in abutment with the end of the conduit regardless of the position of said conduit relative to the body 12 of the coupling. Thus, at no time are the wires being drawn through the conduit subject to abrasion or obstruction. This adjustable structure also may be satisfactorily employed to take the place of a union, in which event each end of the body may be formed to receive a sleeve and a conduit from opposite directions. If desired, the sleeve may be formed of sheet metal tubing having an annular inwardly directed tapered flange or shoulder for abutting the end of the conduit.

I claim:

1. A conduit coupling comprising, a body portion adapted to receive a conduit; a movable ferrule in said body adapted normally to abut the end of the conduit to provide a smooth interior surface for facilitating the feeding of wires therethrough; and means on said body for securing the conduit in any adjusted position therein.

2. A conduit coupling comprising, a body; a sleeve in said body; a shoulder formed in said sleeve adapted to provide an abutment for the end of a conduit extending therein; and means on the body for frictionally retaining the sleeve and the conduit in any adjusted position relative to the body.

3. A conduit coupling comprising, a substantially cylindrical body adapted to receive the end of a conduit; a movable ferrule in said body frictionally engaging said conduit whereby said ferrule and conduit may be adjusted in unison in the body; and means on said body for securing the conduit in its adjusted position.

4. A conduit coupler comprising, a body portion having one end formed to receive an oval duct; and the other end formed to receive a conduit; removable means in said body providing a smooth surface at the joining of the conduit with the body; and means carried on said body for securing the conduit in place.

5. A conduit coupling comprising, a cylindrical body having a conduit slidably mounted therein; an annulus mounted in said body abutting the end of said conduit, said annulus having an outwardly diverging inner periphery to provide a smooth surface at the joining; and threaded means on the end of said body frictionally to hold the conduit in place.

6. A conduit coupling comprising, in combination, a body; a sleeve in said body, said sleeve being adapted to receive a conduit therein; an annular internal shoulder on the end of said sleeve forming an abutment for the end of said conduit; the inner wall of the sleeve, beyond said shoulder, tapering outwardly to provide a smooth surface at the joining of the conduit with the body; and means on said body for securing the parts in place.

7. A conduit coupling comprising, in combination, a body; an adjustable sleeve in said body, said sleeve being adapted to receive a conduit therein; an annular shoulder on the end of said sleeve forming an abutment for the end of said conduit; the inner wall of said sleeve, beyond said shoulder, tapering outwardly to provide a gradual approach from the inner surface of the body to the inner surface of the conduit; and means on said body for adjustably securing the sleeve and the conduit in position.

8. A conduit coupling comprising, in combination, a cylindrical body portion having a curved extension on one end adapted to receive a plurality of oval ducts and a sleeve slidingly mounted in the other end; means on said body for retaining said sleeve in an adjusted position, said sleeve being adapted to receive a conduit therein; and means formed on said sleeve to provide an abutment for the end of said conduit and to provide a smooth interior surface at the joining of the conduit with the coupling.

9. A conduit coupling comprising, in combination, a body portion having non-adjustable connection means on one end; a sleeve adjustably mounted in the other end; a shoulder on one end of said sleeve adapted to form an abutment for a conduit to be inserted therein, said shoulder being inclined outwardly of the sleeve to provide a smooth interior surface at the joining of the conduit and the body; threads on the end of said body, and an annulus threadingly mounted on said body for clamping the conduit, sleeve, and body together.

10. A conduit coupling comprising, in combination, a body portion having non-adjustable connection means on one end; a sleeve adjustably mounted in the other end; a shoulder on one end of said sleeve adapted to form an abutment for a conduit; said shoulder being inclined toward the end of the sleeve to provide a smooth surface at the joining of the conduit and the body; an annulus threadingly mounted on the end of said body for clamping the conduit, sleeve, and body together; and means on said annulus for positively locking the conduit in place.

11. A conduit coupling comprising, in combination, a cylindrical body portion having a curved extension on one end adapted to receive oval ducts; a sleeve slidably mounted in the other end of said body, having a ferrule on its inner end, adapted to receive a conduit therein; said ferrule forming a shoulder to provide an abutment for the conduit and being flared to provide a smooth surface to facilitate passage of wires therethrough, and means on said body portion for frictionally and positively securing the parts in position.

In testimony whereof, I affix my signature at 10 South La Salle Street, Chicago, Illinois.

JACOB W. LEWIN.